US011978305B1

(12) United States Patent
Wentker

(10) Patent No.: US 11,978,305 B1
(45) Date of Patent: May 7, 2024

(54) METHOD AND SYSTEM FOR PREDETERMINED GAMES OF CHANCE USING SMART CARDS TO SECURELY DISTRIBUTE GAME OUTCOME

(71) Applicant: Tapcentive, Inc., San Francisco, CA (US)

(72) Inventor: David C. Wentker, San Francisco, CA (US)

(73) Assignee: TAPCENTIVE, INC., San Francisco, CA (US)

( * ) Notice: Subject to any disclaimer, the term of this patent is extended or adjusted under 35 U.S.C. 154(b) by 0 days.

(21) Appl. No.: 18/213,531

(22) Filed: Jun. 23, 2023

Related U.S. Application Data

(60) Provisional application No. 63/357,793, filed on Jul. 1, 2022.

(51) Int. Cl.
*G07F 17/32* (2006.01)

(52) U.S. Cl.
CPC ................................ *G07F 17/3223* (2013.01)

(58) Field of Classification Search
CPC . G07F 17/3223; G07F 17/3241; G07F 17/326
See application file for complete search history.

(56) References Cited

U.S. PATENT DOCUMENTS 6,790,143 B2 9/2004 Crumby
7,563,163 B2 * 7/2009 Crumby .............. G07F 17/3244 463/19
10,529,187 B2 1/2020 Irwin, Jr. et al.
10,593,153 B2 3/2020 Shenker et al.
11,263,869 B2 3/2022 Lindelsee et al.
(Continued)

OTHER PUBLICATIONS

Wikipedia entry for "Smart card" downloaded from <https://en.wikipedia.org/wiki/Smart_card>, last edited: May 17, 2023.

*Primary Examiner* — Steve Rowland
(74) *Attorney, Agent, or Firm* — Panitch Schwarze Belisario & Nadel LLP

(57) ABSTRACT

A pool of game outcomes is generated on a smart card that is associated with a gaming machine. The pool of game outcomes is identical to a previously generated pool of game outcomes. A seed is created and a pool of game outcomes is generated using the seed, a pseudorandom number generator (pRNG), game rules, and a pool size. The seed, a game identifier associated with the game rules, and the pool size are stored in a database that is remote from the smart card. The seed, the game identifier, and the pool size are usable for audit purposes to recreate the pool of game outcomes using the same pRNG and the same game rules that are used to generate the original pool of game outcomes. A memory of the smart card associated with the gaming machine is loaded with the seed. The smart card includes same pRNG that is used to generate the original pool of game outcomes. Game outcomes are then generated during game play of the gaming machine using the seed in the memory of the smart card, the pRNG in the smart card, and the game rules used to generate the original pool of game outcomes. The game outcomes generated during game play are identical to the generated original pool of game outcomes.

16 Claims, 6 Drawing Sheets

(56) References Cited

U.S. PATENT DOCUMENTS

| | | | | |
|---|---|---|---|---|
| 11,726,772 | B2 * | 8/2023 | Mooney | G06F 11/1441 713/1 |
| 2003/0130029 | A1 * | 7/2003 | Crumby | G07F 17/32 463/20 |
| 2004/0166942 | A1 * | 8/2004 | Muir | G07F 17/3241 463/43 |
| 2006/0247064 | A1 * | 11/2006 | Nguyen | G07F 17/3232 463/43 |
| 2011/0003627 | A1 * | 1/2011 | Nicely | G07F 17/3244 463/20 |
| 2011/0081971 | A1 * | 4/2011 | Herrmann | G07F 17/3272 463/42 |
| 2017/0039798 | A1 * | 2/2017 | Walker | G07F 17/3244 |
| 2018/0005490 | A1 * | 1/2018 | Reddicks | G07F 17/3258 |
| 2020/0402367 | A1 * | 12/2020 | Oberberger | G07F 17/3223 |
| 2022/0062745 | A1 * | 3/2022 | Hennessy | G07F 17/3213 |
| 2022/0270433 | A1 * | 8/2022 | Nelson | G07F 17/3267 |
| 2022/0351571 | A1 * | 11/2022 | Blackwelder | G07F 17/326 |

* cited by examiner

600

601

610 620

| Game | Pool ID | Seed | Pool Size | RTP | Microproc. Serial # |
|---|---|---|---|---|---|
| Exciting Slots | ES-1 | 91259840 | 1,000,000 | 92.05% | 35469876 |
| Exciting Slots | ES-2 | 03756325 | 1,000,000 | 92.05% | 46890654 |
| Bonus Slots | BS-1A | 53895409 | 500,000 | 92.35% | 05432186 |
| Bonus Slots | BS-1B | 41375818 | 500,000 | 92.32% | 05432186 |
| ... | ... | ... | ... | ... | ... |

630

FIG. 6

METHOD AND SYSTEM FOR PREDETERMINED GAMES OF CHANCE USING SMART CARDS TO SECURELY DISTRIBUTE GAME OUTCOME

CROSS-REFERENCE TO RELATED APPLICATIONS

This application claims priority to U.S. Provisional Patent Application No. 63/357,793 filed Jul. 1, 2022, which is incorporated by reference herein.

FIELD OF THE INVENTION

The present invention is an innovation in electronic gaming devices and systems for gambling games of chance that are legally required to operate based on physically distributed finite pools of predetermined outcomes. The system described herein introduces a memory efficient and highly secure design for operating these games that meets the regulatory requirements for games based on physically distributed finite pools of predetermined outcomes by distributing the outcome pools on smart cards.

BACKGROUND

In many jurisdictions worldwide where gambling is permitted there are special classifications of games that may only reveal predetermined outcomes to players rather than dynamically generated true random chance determined outcomes. In a game of predetermined outcomes, all possible outcomes are known before the game starts thereby guaranteeing to regulators and players that what a game promises can happen, will happen during the play of the game—nothing is left to chance other than which outcome will be revealed next as play continues. Instant ticket games in lotteries and pull-tab ticket games in tribal Class II gaming are two such examples of games that operate on finite pools of predetermined outcomes.

In many jurisdictions, there is an additional requirement that the predetermined outcomes are physically separate from any machines used in the sale and operation of such games. The requirement for physical separation and distribution of the outcomes from any gaming-related machinery represents the difference between a machine that is classified as a device dispensing outcomes or tickets vs. a traditional electronic gambling device such as a slot machine which is operating on unpredictable true random chance with each play.

While there are many forms of gaming systems that operate on finite, predetermined pools of outcomes, the requirement for producing and physically distributing outcome pools for a game has resulted in some interesting but limited innovations in gaming systems. One of the most innovative of these systems is the Lucky Tab II machine from Diamond Game Enterprises which relies on a replaceable spool of paper with all predetermined game outcomes printed on the paper. The player is presented with a screen with animating slot machine reels, but the underlying outcomes are predetermined and printed on the paper spool which is housed in the gaming device cabinet.

While the Lucky Tab machine meets the requirement for physical separation of outcomes from gaming equipment, mechanical operation of the spool within the device presents potential mechanical failures. In addition, the physical spool size that can be accommodated in the device results in maintenance challenges for gaming operators of the gaming machines. A further limitation of the Lucky Tab machines is that the predetermined outcomes printed on the spool can be read by any person who has access to the spools during the printing, distribution, and installation in the gaming machines. This last limitation represents a significant opportunity for cheating by insiders that could result in significant financial losses for gaming operators.

An invention from Tapcentive, Inc. described in U.S. Pat. No. 10,529,187 (Irwin et al.) entitled, "Electronic instant tickets for instant ticket vending machines" attempts to solve a similar problem by storing individual electronic instant tickets on microprocessors which can then be installed in instant ticket vending machines. This invention is limited by the memory size of smart cards because the invention relies on the storage of individual game outcomes in memory. For very large game pools in the millions or 10s of millions as can be desirable in some games, the storage of as little as 1 byte per outcome is far beyond the memory capacity of generally available smart cards which may have as little as 50,000 bytes of memory.

What is needed is a new design for gambling game systems and devices used for games based on predetermined outcome pools that addresses the requirement for the generation and distribution in physical form of the game's predetermined outcome pools without limiting the size of the pool. This new system would ideally create a simple, secure, and reliable means for designing and operating new games; it would also offer a means to quickly and economically convert popular slot machine games and devices that were designed to operate on true random chance outcomes to instead operate on physically separate finite pools of predetermined outcomes without changing the game designer's intended gameplay experience in any manner through this conversion.

SUMMARY OF THE INVENTION

Objects and advantages of the invention will be set forth in part in the following description, or may be obvious from the description, or may be learned through practice of the invention. Described are mechanisms, systems, and methodologies related to electronic gaming devices and smart cards enabling hitherto unknown levels of functionality, security, and flexibility.

This invention is a system for electronic gaming and gambling devices where one or more secure, tamper resistant smart card microprocessors are designed and configured as means to physically distribute finite outcome pools to gambling devices thereby controlling and guaranteeing that all game outcomes offered by the devices are already known prior to the start of gameplay in a manner similar to loading a stack of preprinted tickets to a ticket dispensing gaming machine.

In the present invention, the creation of a finite outcome pool for a game begins by generating all desired outcomes in a secure computing environment separate from the smart card. This computing environment includes the implementation of the game rules and a random number generator which together drive the generation of the outcomes.

While there are many different implementations of random number generators including those that rely on hardware for randomness and others that rely exclusively on various software algorithms for randomness, the random number generator used in the generation of the outcomes pools in the present invention is software-based and referred to as a pseudorandom number generator (PRNG). It should be noted that pseudorandom number generators are also referred to as deterministic random bit generators. An example of well-known PRNG is the Mersenne Twister.

A PRNG is used to generate numbers that approximate truly random numbers; however, a PRNG is not truly random because all values it generates are determined by an initial input referred to as the "seed." The specific details of the seed depend on which PRNG algorithm is used. The key design principal of PRNGs is that if the same seed is used twice as input to the PRNG, the identical set of random numbers will be generated twice. This principal of reproducibility of numbers generated by the PRNG based on the use of the same seed as input is essential to this invention.

Once the pool has been generated it is analyzed to confirm all of the winning and losing outcomes and to calculate the resulting return-to-player (RTP) across the entire pool. All of this information about the pool along with the seed is then stored in a secure, database system. Because the pool can be reliably reproduced based on the pool data and PRNG, the outcomes from the pool can then be deleted from the secure computing environment to protect against the possibility of the pool outcomes being exposed to anyone intent on cheating the system. In a preferred embodiment, the seeds are stored in a specialized high security data storage device referred to as a hardware security module (HSM) which can be set up with access controls requiring multiple, separate users to provide individual passwords or keys together to unlock access to the seeds in the HSM.

With the information about the pool and seed now securely stored, this data is then securely transmitted to a card manufacturer for loading into a smart card microprocessor. The smart card microprocessor contains an implementation of the game rules and PRNG that match the implementation in the secure computing environment that was used to generate the pool. In a preferred embodiment the implementations of the game rules and PRNG in the secure computing environment and smart card are tested and verified by an independent gaming laboratory to certify that outcome data generated by both systems is identical when using the same seed.

Once the smart card contains the pool information and seed, the smart card can then be installed in a gaming device which includes a smart card reader and has been designed to operate based on the smart card-controlled outcome pools. Because the game rules, seed, and PRNG present in the smart card follow the same implementation as was used in the generation of the pool in the secure computing environment, the smart card will generate the same outcome pool during gameplay thereby guaranteeing that all outcomes are predetermined and known in advance.

Gameplay begins by the player putting money into the gaming device through whatever means is available in the gaming device and system. The player then places a bet through the player controls of the gaming device. The gaming device then communicates the player's bet and play request to the smart card and requests an outcome. The smart card checks to see that the pool has available game outcomes and if so, returns the next available outcome from the pool using the game rules, secure seed, and PRNG in the card. Play can continue until all outcomes from the pool have been revealed. Once that happens, a new smart card with a different seed may be loaded into the gaming device for gameplay to continue.

Described are a number of mechanisms and methodologies that provide practical details for reliably producing the gaming system.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 6 is an exemplary diagram of database data illustrating the results from the generation of different outcome pools and set up of those pools in individual smart cards.

DETAILED DESCRIPTION OF PREFERRED EMBODIMENTS

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Certain terminology is used herein for convenience only and is not to be taken as a limitation on the present invention. The words "a" and "an", as used in the claims and in the corresponding portions of the specification, mean "at least one." In the context of this invention, discussions utilizing terms such as "providing", "receiving", "responding", "verifying", "challenging", "generating", "transmitting", "authenticating", or the like, often refer to the actions and processes of an electronic computing devices and/or system. The electronic computing device and/or system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Figure 1:
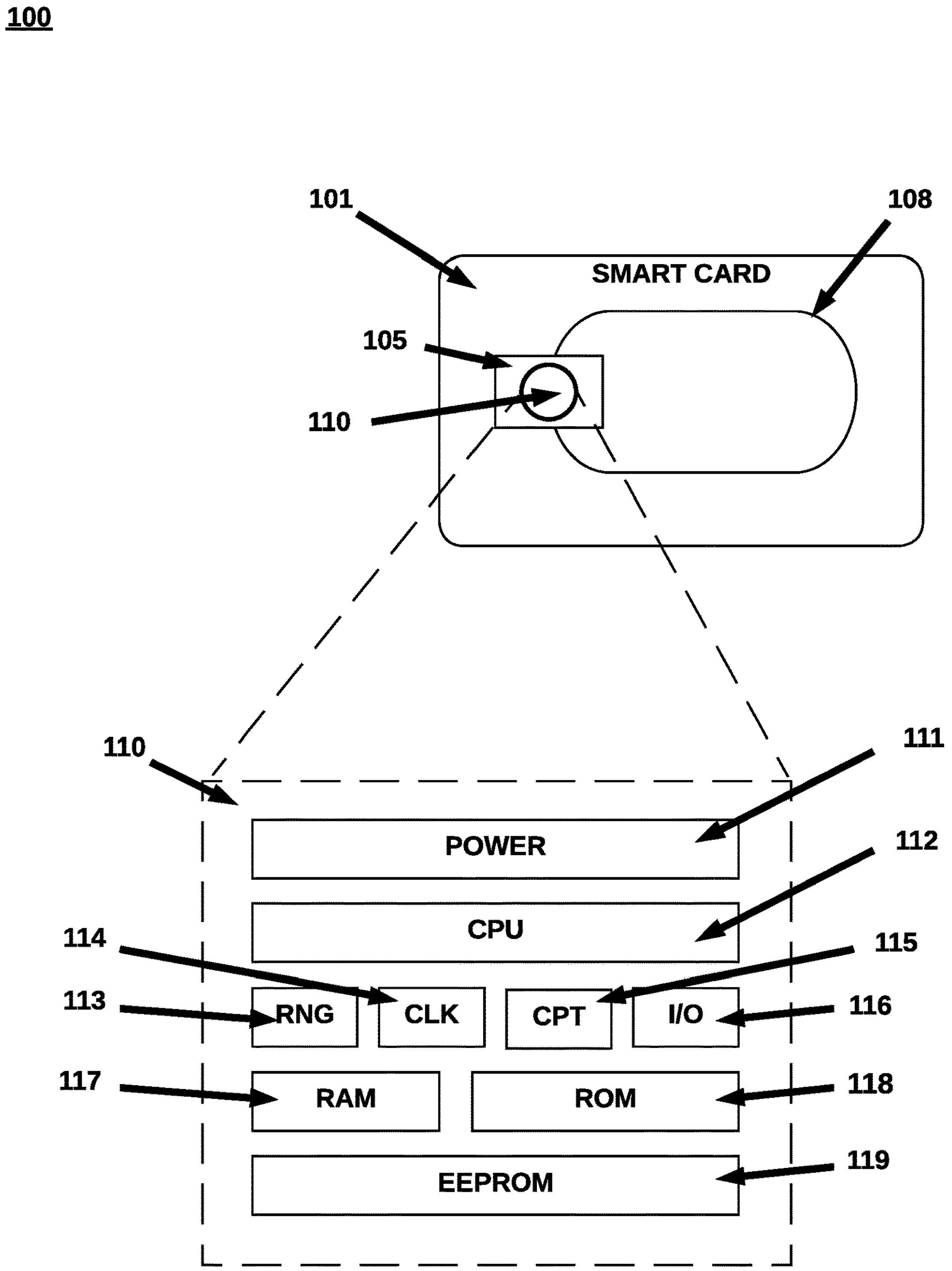
FIG. 1 PRIOR ART
FIG. 1 is an exemplary block diagram of a prior art smart card.

For clarity it may be beneficial to provide a brief description of the current state of the art of smart card technology to ensure that a common lexicon is established for this existing technology. With reference now to FIG. 1, a block diagram 100 of an embodiment of a typical prior art smart card 101 is shown where a microprocessor 110 is embedded in a plastic card body. The microprocessor has two possible communications interfaces. One or both may be present in the smart card. The first is referred to as "contact" and complies with the ISO/IEC 7816 standard which defines a physical, electromechanical connection to the card's microprocessor 110 via a metal contact plate 105. The second is referred to as "contactless" and complies with the ISO/IEC 14443 standard with defines a radio frequency (RF) connection to the microprocessor 110 via an RF antenna 108.

As will be evident to one skilled in the art, a smart card may include only a contact interface is which case the card is referred to as a contact smart card. Alternatively, a smart card may include only a contactless interface in which case the card is referred to as a contactless smart card. If both contact and contactless interfaces are present in the smart card, it is referred to as a dual-interface smart card.

A functional detail of smart card microprocessor 110 includes: Power 111 converter, a Central Processing Unit (CPU) 112, a Random Number Generator (RNG) 113, a connection for an external Clock (CLK) 114 provided by the I/O port 116, a Cryptographic Coprocessor (CPT) 115, an Input/Output (I/O) port 116, Random Access Memory (RAM) 117, Read-Only Memory (ROM) 118, and Electronically Erasable Programmable Read Only Memory (EEPROM) 119. Device-unique firmware and data can be stored and run from ROM 118 or EEPROM 119 and could, optionally, rely on the support of the RNG 113 and CPT 115 for many of the operations. A microprocessor 110 (e.g., SmartMX® designed by NXP® or the SLE 77 designed by Infineon®) is also typically packaged with multiple physical security measures which give it a degree of tamper resistance which is important when the microprocessor is included in devices designed for use in security-sensitive applications.

It may also be helpful to define a number of terms related to gaming which are used throughout the description starting with the term "game" which can refer to any game of chance that can be implemented in a general-purpose computing device or electronic gaming machine.

The term "seed" refers to the input value for a pseudo-random number generator (PRNG) so that a series of random numbers can be generated. If the same seed is used twice with the PRNG, the same series of random numbers will be generated twice.

The term "game rules" refers to all aspects of game design that determine what outcomes are possible from playing the game. For example, with a slot machine game these rules include the number of reels, symbols on each reel, and the paytable that lists each winning combination of reel symbols and the associated winning amounts.

The term "outcome" or "game outcome" refers to the result of a single play in a game-of-chance. An outcome is either a win with an associated winning amount based on the player's bet or a loss (non-winner) resulting in the player losing their bet.

The term "gaming device" or "gaming machine" refers to any type of electronic gaming hardware including floor-standing cabinets typical of slot machines installed on casino gaming floors, bar-top gaming machines, kiosks, handheld devices, or any of the many other forms offered by gaming device manufacturers. The term may also refer to personal computing devices such as computers, tablets, and mobile phones all which have capabilities and/or accessories that enable them to communicate with smart cards.

Having concluded the discussion of exemplary prior art smart cards and gaming terminology, various embodiments of the present invention will now be disclosed. As will be apparent to one skilled in the art, the present invention overcomes many of the inherent disadvantages and limitations of distributing, finite game pools to gaming devices.

Figure 2:
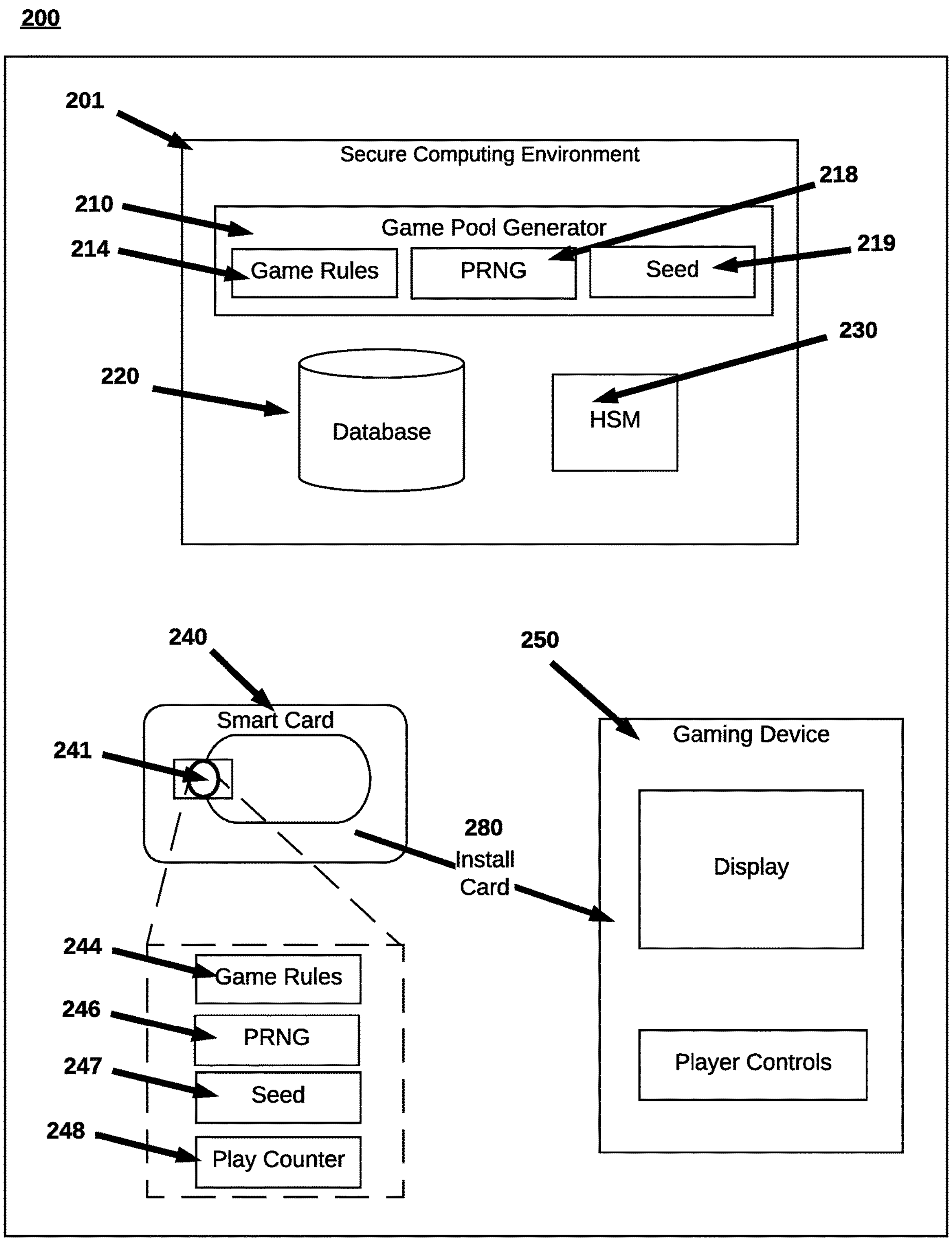
FIG. 2 is a representative schematic graphical overview of a preferred embodiment of the invention illustrating the components involved: a secure computing environment where an outcome pool is generated, a smart card that generates an identical outcome pool, and a gaming device that relies on the smart card for game outcomes.

In a preferred embodiment 200 of FIG. 2, the following components are involved: a secure computing environment 201, a smart card 240, and a gaming device 250. The secure computing environment 201 includes a game pool generator 210, a database 220, and an optional hardware security module (HSM) 230. The game pool generator 210 includes game rules 214 for each game and a PRNG 218. The smart card 240 includes game rules 244 and a PRNG 246 that match the games rules 214 and PRNG 218 contained within the game pool generator 210 of the secure computing environment 201. The smart card 240 also includes a play counter 248 that tracks the number of plays that have been revealed from a game pool to ensure that the maximum number of outcomes that can be generated by the smart card 240 matches the game pool size loaded to the smart card 240. The gaming device 250 is the machine the player interacts with to play the games of chance. The smart card 240 is installed 280 in the gaming device to control the outcomes of the game. The game pool generator 210 further includes seed 219 for use by the PRNG 218 and the smart card memory further includes seed 247 for use by the PRNG 246. The seed 247 has the same value as the seed 219.

Figure 3:
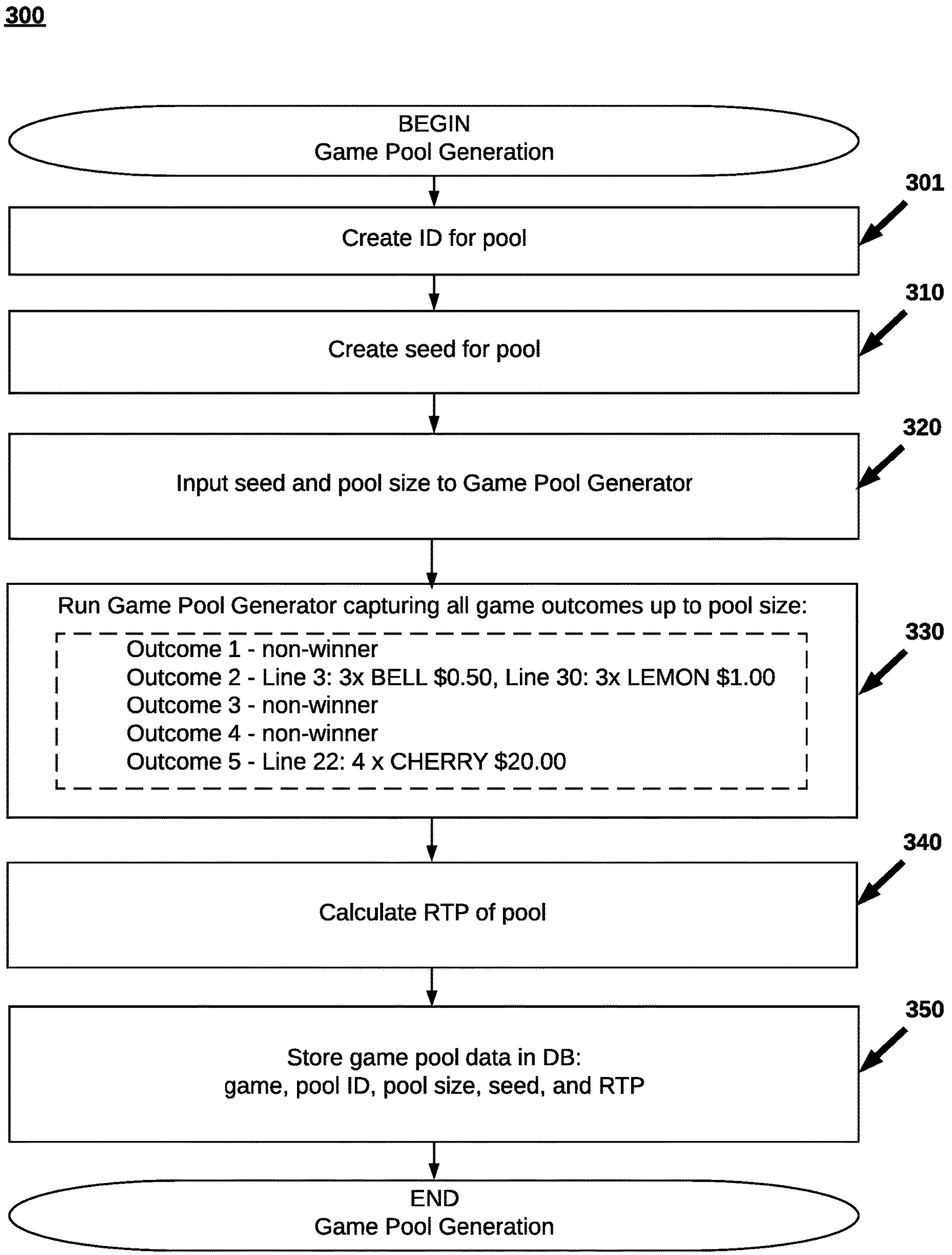
FIG. 3 is a flow diagram illustrating the process from FIG. 2 for generating an outcome pool in the secure computing environment.

FIG. 3 illustrates the process flow 300 for generating a pool of outcomes for a game in the secure computing environment 201 of FIG. 2. The first step, 301 involves the creation of an identifier (ID) to uniquely reference the pool to be generated.

The second step 310 involves the creation of a unique seed which will be used with the PRNG 218 in the game pool generator 210 of the security computing environment 201 of FIG. 2.

The third step 320 involves the input into the game pool generator 210 of the seed from step 310 along with a desired pool size specifying the number of outcomes that are to be generated.

The first fourth step 330 illustrates a sample of outcomes that are generated by the game pool generator 210 using the seed from step 310 as input to the PRNG 218 in the game pool generator 210. The game type used in this example is a slot machine game where outcomes with winning amounts are determined by lines of matching symbols. As would be evident to one skilled in the art, depending on the game rules for a particular game, the number of random values required from the PRNG 218 per outcome may be more than one. For example, a slot machine game with 5 reels requires 5 random numbers per outcome to determine the stop position on each of the 5 reels to then calculate all of the possible winning amounts that together represent the outcome. Therefore, in the example shown in Step 330, if the game involved 5 reels, a total of 25 random numbers would be generated by the PRNG to determine the 5 outcomes.

The fifth step 340 involves the analysis and summation of the generated game pool data to determine the return-to-player (RTP) once all outcomes have been generated up to the requested pool size. As is evident by those skilled in the art, calculating an RTP for a pool of outcomes involves the sum of all winning amounts divided by the cost (bets) of all plays.

The sixth step 350 involves the storing in the database 220 of FIG. 2 of all the data required to generate the game pool along with the calculated RTP from step 340. In an alternative embodiment to provide a higher level of security than is typically offered by a database system, the seeds may be stored in the HSM 230. It should be noted that with this data stored in the database 220, the identical pool can be generated again in the future for audit or dispute purposes using this database data again with the game pool generator 210 of FIG. 2. Because the outcome pool can be regenerated, in one embodiment all outcome pool data from Step 350 can be securely deleted. In an alternative embodiment, the entire game pool of all outcomes is stored in the database 220, preferably in encrypted format to prevent cheating by insiders or hackers gaining access to the pool to identify which outcomes in the pool offer the largest winning amounts.

Figure 4:
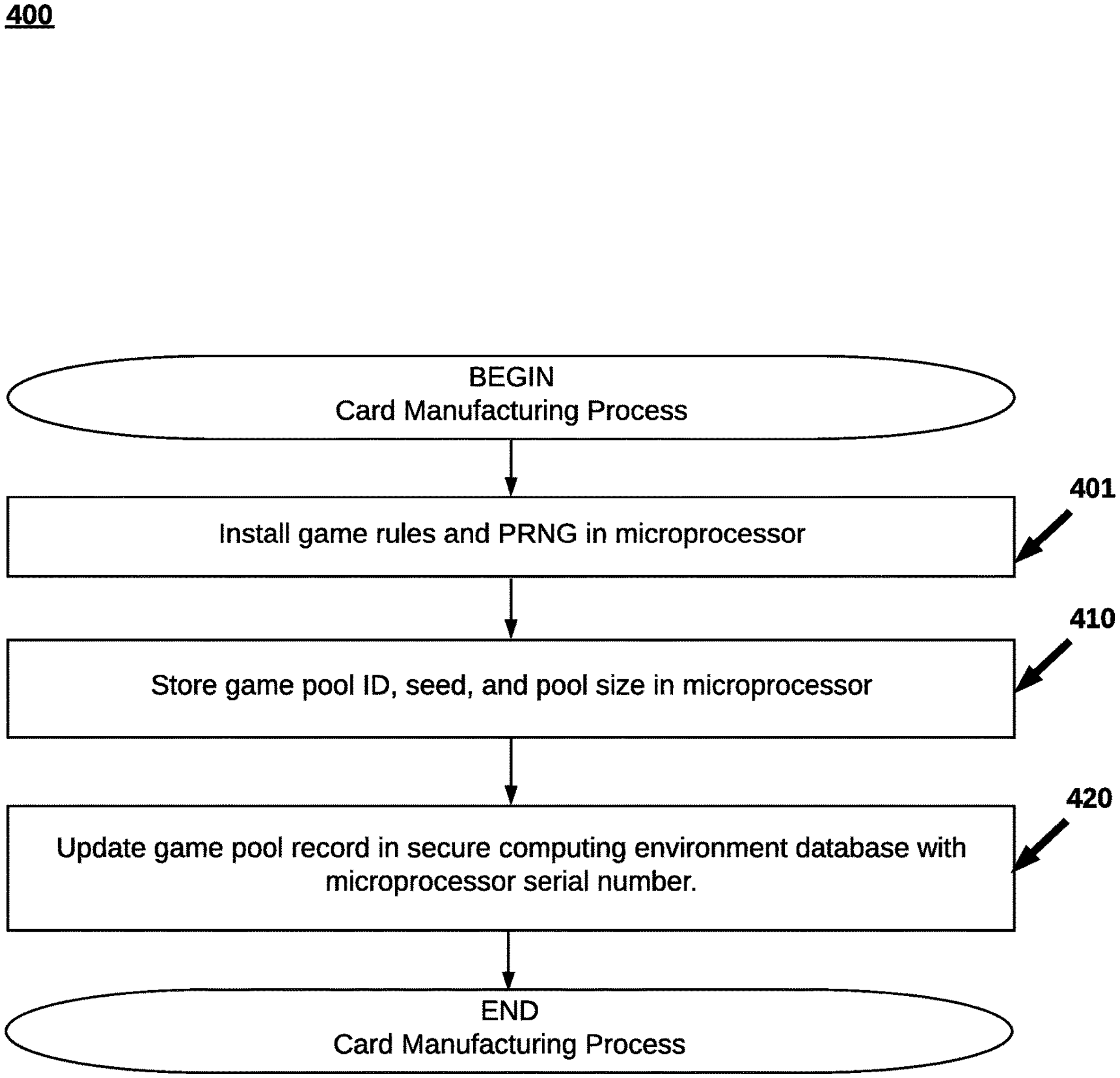
FIG. 4 is a flow diagram illustrating the process from FIG. 2 of manufacturing the smart card so that it will generate the identical outcome pool from FIG. 3.

FIG. 4 illustrates the process flow 400 for manufacturing a smart card 240 of FIG. 2 to enable the smart card microprocessor (processor) 241 to generate the identical game outcomes generated in process flow 300 of FIG. 3. The first step 401 involves the installation in the smart card microprocessor 241 of the game rules 244, PRNG 246 and a play counter 248 for tracking plays. As described previously, the game rules 244 and PRNG 246 in the smart card microprocessor 241 are functionally identical to game rules 214 and PRNG 218 in the game pool generator 210 of the secure computing environment 201.

The second step 410 involves the storing of the game pool ID, seed, and pool size in the smart card microprocessor 241.

The third step 420 involves adding the chip serial number from the smart card microprocessor 241 to the database 220 record that was created when the game pool was generated in the secure computing environment 201 in Step 350 of FIG. 3. This update provides a record of which physical smart card will generate the identical game pool outcomes referenced in the database record.

Figure 5:
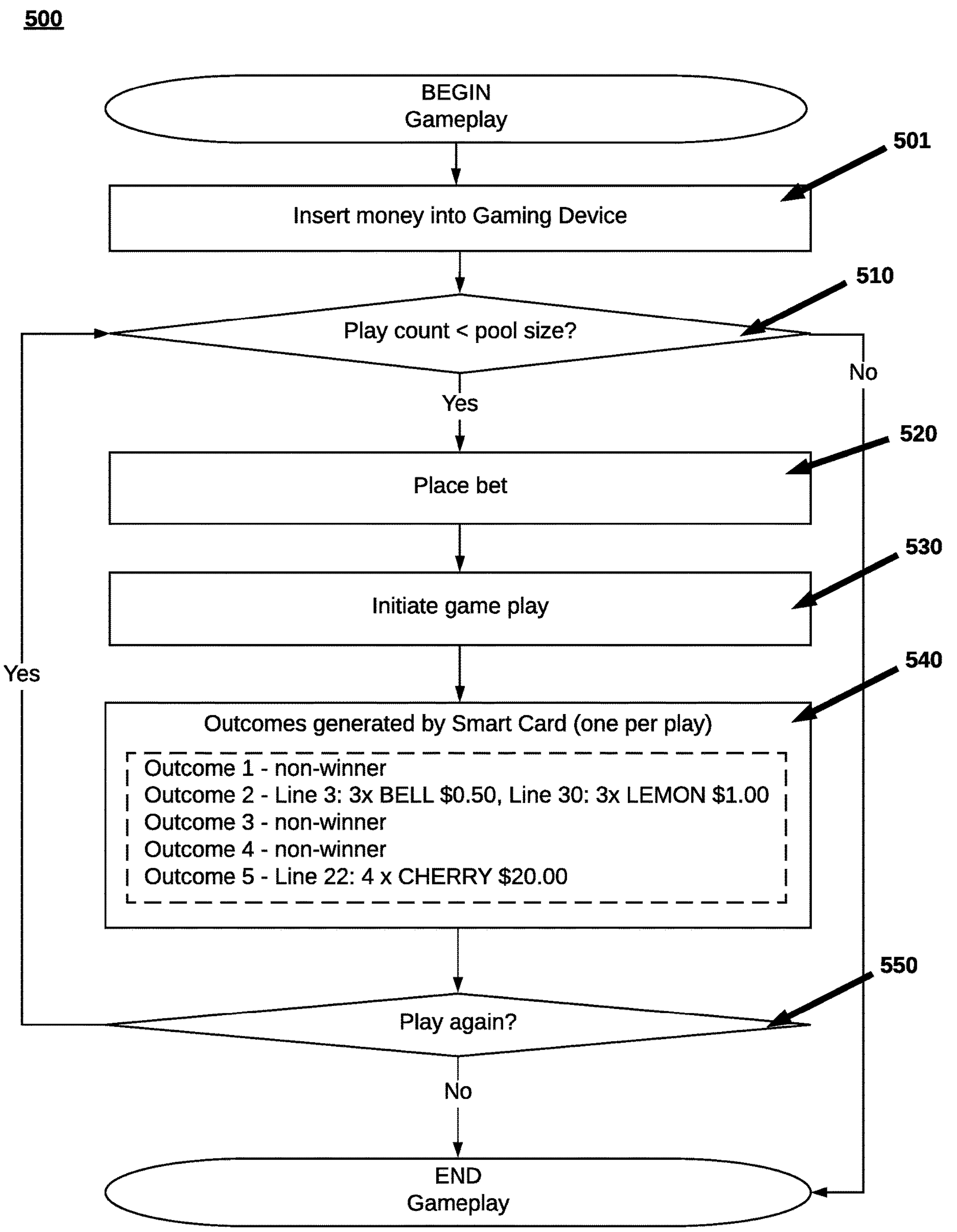
FIG. 5 is a flow diagram illustrating the interaction in FIG. 2 between a gaming device and a smart card containing the outcome pool.

FIG. 5 illustrates the process flow 500 for playing a game via a gaming device 250 of FIG. 2 where the game outcome is delivered from the smart card microprocessor 241 of FIG. 2 which is installed in the gaming device 250. The first step 501 involves the player inserting money or some other consideration recognized by the gaming device 250 to be used making bets in the game.

The second step 510 involves the gaming device 250 of FIG. 2 communicating with the smart card microprocessor 241 of FIG. 2 to confirm that there are game outcomes remaining in the pool to be revealed by comparing the play counter 248 in the smart card microprocessor 241 to the pool size that was loaded to the smart card microprocessor 241 in step 320 of FIG. 3.

The third step 520 involves the player placing a bet in the game using funds loaded in step 501.

The fourth step 530 involves the initiation of the game play with the player's specified bet. For the player this typically involves pressing a "play" or "spin" button on the gaming device. During this step, the gaming device 250 of FIG. 2 communicates a request to the smart card microprocessor 241 of FIG. 2. for the next available outcome from the game pool.

The fifth step 540 involves the smart card microprocessor 241 generating the next available outcome from the game pool using the stored seed, PRNG 246, and game rules 244, and then increments the play counter 248 by one. Step 540 includes an illustration of the outcomes that are available in the pool in the smart card microprocessor 241. While the diagram illustrates multiple outcomes in step 540, it should be noted that each play only results in a single outcome. The multiple outcome illustration is included to show the exact match to the outcomes generated in the secure computing environment 201 as illustrated in Step 330 of FIG. 3.

The sixth step 550 involves the player choosing to play again or stop playing. As noted above, if all outcomes from the pool in the smart card microprocessor 241 have been generated, the player will be forced to stop play until a new smart card with a new pool can be installed in the gaming device 250.

In some jurisdictions, there may be a requirement to print a paper receipt showing the game outcome(s) in addition to showing the outcome(s) in the gaming device 250 game display. This paper receipt may also be generated at the request of the player but in either case it is just a printed record of the predetermined outcome and has no effect on gameplay or game results.

FIG. 6 is an illustration of records 601 in database 220 of FIG. 2 related to game pools that have been generated in the secure computing environment 201 and follow the process described in FIG. 3. As will be evident to one skilled in the art of game design involving predetermined outcome pools, there can be many different approaches that may require different physical distribution of outcomes such as, a single pool on a single smart card, multiple pools on single smart card, or multiple separate physical pools that together make up a single game. The present invention supports all these possibilities and others that will be evident to those skilled in the art.

In the illustrative database records a game entitled Exciting Slots has two separate pools 610 and 620 each containing 1,000,000 outcomes that have been generated from different seeds and installed in two different smart card microprocessors 241 as indicated by the unique chip serial numbers in each record. In other illustrative records, a game entitled Bonus Slots has two separate pools of 500,000 outcomes that together make up total combined pool of 1,000,000 outcomes with both pools installed on the same smart card microprocessor 241 as illustrated by their matching chip serial numbers 630. In yet another possible embodiment not shown in FIG. 6, a total game pool of 1,000,000 outcomes could be created by generating 1,000 pools of 1,000 outcomes each to be installed on 1,000 separate smart card microprocessors 241.

In light of the above description, a number of advantages in the present invention can be seen. The invention provides for physical distribution of predetermined outcome pools for use with gaming devices involving smart cards and use of pseudo random number generators to overcome the inherent limitation of storing very large amounts of game pool data that would otherwise be required if every outcome were to be stored individually in the smart card. This advantage in efficient use of memory for very large pools of predetermined game outcome pools also enables the conversion of existing slot machine games from operating based on true random chance to instead operate on predetermined outcomes without any impact to the player's game play experience as will now be described.

As is well understood in the gaming industry, slot machine players typically play at very high rate where it can be common to generate outcomes every few seconds resulting in thousands of outcomes per hour. As previously noted, smart cards typically include a limited amount of memory. With the present invention, individual outcomes are not stored within the smart card thereby avoiding this limitation. In addition, the conversion of an existing successful slot game that was designed to operate on a traditional or true RNG (as opposed to a PRNG) can be accomplished very easily via the present invention by first implementing the game rules of the game in the secure computing environment 201 and smart card microprocessor 241. Next, creating a very large predetermined outcome pool from the game, for example 100,000,000 can be accomplished in minutes or even seconds using today's high powered computing environments. With the smart card then manufactured and containing the seed used in generating the predetermined pool as described earlier, the slot machine hardware and software can be modified to accept outcomes generated by the smart card instead of through a true RNG. It should be noted that a pool of outcomes which are generated using a well-designed PRNG algorithm may be considered predetermined by a gaming laws or regulations, however, those outcomes will indistinguishable to a player who is accustomed to playing the same game using a true RNG where the outcomes are dynamically generated.

A number of variations and modifications in the invention can be used. It is possible to use some aspects of the invention without using others. For example, as will be apparent to one skilled in the art, an alternative embodiment could involve the installation of the game rules on the gaming device 250 instead of on the smart card microprocessor 241 as described previously. In this alternative embodiment, the PRNG continues to be the source of random numbers that together with the game rules determine the game outcomes, but the calculation of the outcomes takes place on the gaming device 250 instead of within the smart card. In yet another embodiment, the game rules may implement the game of bingo where a combination of bingo number draws and bingo cards are matched to determine outcomes. And in yet another alternative embodiment bingo number draws from bingo sessions are captured in a pool to be played back in the future from the smart card for those games that allow for historical bingo draws to determine winning and losing outcomes. Another embodiment similar to the previous bingo example is the game of keno where keno number draws from keno sessions are captured in a pool to be played back in the future from the smart card where historical keno draws are used to determine winning and losing outcomes. Games involving other types of pools of predetermined outcomes such as electronic instant-win games or "eInstants" may also be easily implemented with the present invention.

The embodiments described above are implemented using the smart card microprocessor 241. However, the form factor for smart cards and their associated microprocessor may vary with different applications. For example, a smart card used in mobile telephony is often referred to as a subscriber identity module or "SIM" card and comes in several different sizes as defined in the ISO/IEC 7810:2003 standard. While the sizes differ, the underlying capabilities of the microprocessors used in each are the same. The smart card discussed herein is intended to include any of these alternative form factors.

In addition, as will be evident to one skilled in the art, smart cards include capabilities for securely updating their memory such that it would be possible to add a new seed to an existing card to enable a new pool of game outcomes to be generated by that card without physically replacing that card with a new card. This alternative embodiment would address the problem of gameplay where the play count is equal to the pool size and gaming has stopped.

What is claimed is:

1. A method for generating a pool of game outcomes on a smart card that is associated with a gaming machine, wherein the pool of game outcomes is identical to a previously generated pool of game outcomes, the method comprising:

(a) creating a seed;

(b) generating, using a game pool generator, a pool of game outcomes using:

(i) the seed, (ii) a pseudorandom number generator (pRNG), (iii) game rules, and (iv) a pool size;

(c) storing in a database that is remote from the smart card:

(i) the seed, (ii) a game identifier associated with the game rules, and (iii) the pool size, the seed, the game identifier, and the pool size being usable for audit purposes to recreate the pool of game outcomes using the same pRNG and the same game rules that are used in step (b);

(d) loading memory of the smart card associated with the gaming machine with the seed, the smart card including the same pRNG that is used in step (b); and (e) generating game outcomes during game play of the gaming machine using:

(i) the seed in the memory of the smart card, (ii) the pRNG in the smart card, and (iii) the game rules used in step (b), wherein the game outcomes generated in step (e) are identical to the game outcomes generated in step (b), wherein the game rules used in step (e) are stored in the memory of the gaming machine.

2. The method of claim 1 further comprising:

(f) incrementing a game count after generation of each game outcome in step (e);

(g) detecting when the game count reaches the pool size; and (h) allowing additional game play by the gaming machine whenever the game count has not exceeded the pool size.

3. The method of claim 2 wherein additional game play is permitted by the gaming machine by:

(h) repeating steps (a)-(c) using a new seed; and (i) loading the new seed into the memory of the smart card that is associated with the gaming machine, or associating a new smart card having the new seed therein with the gaming machine.

4. The method of claim 1 wherein the pool of game outcomes generated in step (b) are not stored after being generated.

5. A system for generating a pool of game outcomes on a smart card that is associated with a gaming machine, wherein the pool of game outcomes is identical to a previously generated pool of game outcomes, and wherein the system uses a created seed, and wherein memory of the smart card associated with the gaming machine is loaded with the seed, and wherein the smart card includes a pseudorandom number generator (pRNG), the system comprising:

(a) a game pool generator configured to generate a pool of game outcomes using:

(i) the seed, (ii) a pRNG, the pRNG of the smart card being the same pRNG used by the game pool generator, (iii) game rules, and (iv) a pool size;

(b) a database that is remote from the smart card and stores:

(i) the seed, (ii) a game identifier associated with the game rules, and (iii) the pool size, the seed, the game identifier, and the pool size being usable for audit purposes to recreate the pool of game outcomes using the same pRNG and the same game rules that are used by the game pool generator; and (c) a processor of the smart card configured to generate game outcomes during game play of the gaming machine using:

(i) the seed in the memory of the smart card, (ii) the pRNG in the smart card, and (iii) the game rules used by the game pool generator, wherein the game outcomes generated by the processor of the smart card are identical to the game outcomes generated by the game pool generator, wherein the game rules used by the processor of the smart card are stored in the memory of the gaming machine.

6. The system of claim 5 wherein the processor of the smart card is further configured to:

(iv) increment a game count after generation of each game outcome generated by the processor of the smart card, (v) detect when the game count reaches the pool size, and (vi) allow additional game play by the gaming machine whenever the game count has not exceeded the pool size.

7. The system of claim 6 wherein additional game play is permitted by the gaming machine by repeating the generation of a pool of game outcomes using a new seed, and loading the new seed into the memory of the smart card that is associated with the gaming machine, or associating a new smart card having the new seed therein with the gaming machine.

8. The system of claim 5 wherein the pool of game outcomes generated using the game pool generator are not stored after being generated.

9. A method for generating a pool of game outcomes on a smart card that is associated with a gaming machine, wherein the pool of game outcomes is identical to a previously generated pool of game outcomes, the method comprising:

(a) creating a seed;

(b) generating, using a game pool generator, a pool of game outcomes using:

(i) the seed, (ii) a pseudorandom number generator (pRNG), (iii) game rules, and (iv) a pool size;

(c) storing in a database that is remote from the smart card:

(i) the seed, (ii) a game identifier associated with the game rules, and (iii) the pool size, the seed, the game identifier, and the pool size being usable for audit purposes to recreate the pool of game outcomes using the same pRNG and the same game rules that are used in step (b);

(d) loading memory of the smart card associated with the gaming machine with the seed, the smart card including the same pRNG that is used in step (b); and (e) generating game outcomes during game play of the gaming machine using:

(i) the seed in the memory of the smart card, (ii) the pRNG in the smart card, and (iii) the game rules used in step (b), wherein the game outcomes generated in step (e) are identical to the game outcomes generated in step (b), and wherein the pool of game outcomes generated in step (b) are not stored after being generated.

10. The method of claim 9 further comprising:

(f) incrementing a game count after generation of each game outcome in step (e);

(g) detecting when the game count reaches the pool size; and (h) allowing additional game play by the gaming machine whenever the game count has not exceeded the pool size.

11. The method of claim 10 wherein additional game play is permitted by the gaming machine by:

(h) repeating steps (a)-(c) using a new seed; and (i) loading the new seed into the memory of the smart card that is associated with the gaming machine, or associating a new smart card having the new seed therein with the gaming machine.

12. The method of claim 9 wherein the game rules used in step (e) are stored in the memory of the gaming machine.

13. A system for generating a pool of game outcomes on a smart card that is associated with a gaming machine, wherein the pool of game outcomes is identical to a previously generated pool of game outcomes, and wherein the system uses a created seed, and wherein memory of the smart card associated with the gaming machine is loaded with the seed, and wherein the smart card includes a pseudorandom number generator (pRNG), the system comprising:

(a) a game pool generator configured to generate a pool of game outcomes using:

(i) the seed, (ii) a pRNG, the pRNG of the smart card being the same pRNG used by the game pool generator, (iii) game rules, and (iv) a pool size;

(b) a database that is remote from the smart card and stores:

(i) the seed, (ii) a game identifier associated with the game rules, and (iii) the pool size, the seed, the game identifier, and the pool size being usable for audit purposes to recreate the pool of game outcomes using the same pRNG and the same game rules that are used by the game pool generator; and (c) a processor of the smart card configured to generate game outcomes during game play of the gaming machine using:

(i) the seed in the memory of the smart card, (ii) the pRNG in the smart card, and (iii) the game rules used by the game pool generator, wherein the game outcomes generated by the processor of the smart card are identical to the game outcomes generated by the game pool generator, and wherein pool of game outcomes generated using the game pool generator are not stored after being generated.

14. The system of claim 13 wherein the processor of the smart card is further configured to:

(iv) increment a game count after generation of each game outcome generated by the processor of the smart card, (v) detect when the game count reaches the pool size, and (vi) allow additional game play by the gaming machine whenever the game count has not exceeded the pool size.

15. The system of claim 14 wherein additional game play is permitted by the gaming machine by repeating the generation of a pool of game outcomes using a new seed, and loading the new seed into the memory of the smart card that is associated with the gaming machine, or associating a new smart card having the new seed therein with the gaming machine.

16. The system of claim 13 wherein the game rules used by the processor of the smart card are stored in the memory of the gaming machine.

* * * * *